United States Patent [19]
Landoll et al.

[11] Patent Number: 5,013,056
[45] Date of Patent: May 7, 1991

[54] LOW LOAD ANGLE STEP DECK TRAILER HAVING SHIFTABLE UNDERCARRIAGE

[75] Inventors: Donald R. Landoll; Kelly Williams; Ted Peck, all of Marysville, Kans.

[73] Assignee: Landoll Corporation, Marysville, Kans.

[21] Appl. No.: 354,637

[22] Filed: May 19, 1989

[51] Int. Cl.$^5$ .............................................. B60P 1/04
[52] U.S. Cl. ............................ 280/425.2; 280/149.2; 414/495
[58] Field of Search ............... 414/474, 475, 482, 483, 414/495; 280/425.2, 441.2, 433, 438.1, 462, 417.1, 407, 407.1, 149.2

[56] References Cited

U.S. PATENT DOCUMENTS

| | | | |
|---|---|---|---|
| 2,717,707 | 9/1955 | Martin | 280/407.1 |
| 2,776,769 | 1/1957 | McDonald | 414/482 |
| 3,841,509 | 10/1974 | Chisum | 280/149.2 |
| 3,861,716 | 1/1975 | Baxter et al. | 280/441.2 |
| 4,125,198 | 11/1978 | Landoll | 214/506 |
| 4,130,211 | 12/1978 | Abascal | 414/483 |
| 4,231,710 | 11/1980 | Landoll | 414/475 |
| 4,302,022 | 11/1981 | Schoeffler et al. | 280/417.1 |
| 4,568,235 | 2/1986 | Bills, Jr. | 414/477 |

FOREIGN PATENT DOCUMENTS

0246500 6/1987 Fed. Rep. of Germany ...... 414/495

Primary Examiner—Charles A. Marmor
Assistant Examiner—Victor E. Johnson
Attorney, Agent, or Firm—Hovey, Williams, Timmons & Collins

[57] ABSTRACT

A trailer having a tiltable main deck and a shiftable undercarriage includes an undercarriage assembly having a deck support structure mounted thereon for supporting the deck. The deck support structure includes lifting arms for lifting the elongated deck assembly relative to the undercarriage independently of the undercarriage shifting mechanism so that the deck may be lifted relative to the undercarriage without simultaneouly shifting the undercarriage along the deck. The trailer may include a hitch assembly that permits the trailer to be pivotally connected to a towing vehicle to permit the forward deck to be tilted away from the main deck to increase the angle between the main deck and the forward deck when the trailer is in the unloading position. Further, a deck angle adjustment assembly is disclosed for adjusting the relative positions of the decks.

19 Claims, 6 Drawing Sheets

LOW LOAD ANGLE STEP DECK TRAILER HAVING SHIFTABLE UNDERCARRIAGE

BACKGROUND OF THE INVENTION

1. Field of the Invention

The present invention relates generally to trailers and, more particularly, to a trailer for loading and transporting large specialized vehicles such as farm and construction machinery, buses and tractors, and for use in other industrial applications.

2. Discussion of the Prior Art

It is known to provide a trailer having a shiftable undercarriage which includes a pair of tracks on the bed and a pair of ramps for raising the bed relative to the undercarriage when the latter is shifted from a roading position to provide sufficient spacing between the bed and the undercarriage for clearance of the bed understructure during movement of the undercarriage. Examples of such a construction are illustrated in U.S. Pat. Nos. 4,125,198 and 4,231,710 to Landoll.

It would be desirable to further improve the construction and operation of these known devices by reducing the roading height of a trailer to permit the trailer to be used in transporting taller machinery than was permitted to be transported with previous trailers. In addition, it would be advantageous to provide a trailer having a still lower angle of loading than presently exists on known trailers so as to increase the utility of the trailer and to permit loading of machinery having very little ground clearance such as buses, asphalt laydown equipment, fork lifts and aerial lift equipment.

OBJECTS AND SUMMARY OF THE INVENTION

It is an object of the present invention to provide a trailer having a deck which may be tilted relative to the ground by any angle between a first minimum load angle and a second maximum angle, such that the deck is movable within a wide range of positions for loading, unloading and ground dumping cargo therefrom.

It is a further object of the invention to reduce the weight of a trailer while increasing the capacity such that the trailer is capable of use in transporting cargo of greater weight than would be allowed with heavier trailers.

Another object of the invention is to provide a trailer including a mechanism for independently lifting the trailer deck relative to the undercarriage in order to permit the deck to be raised to the level of a loading dock for easy loading and unloading therefrom and to permit adjustment of the deck height at any position of the undercarriage without affecting the carriage position along the length of the deck.

The present invention also has as an object, that of providing a mechanism which evenly distributes loads between the axles of the undercarriage regardless of the longitudinal position of the undercarriage or of the tilt angle of the deck. This mechanism also provides for maximum axial stability of the load on the disclosed trailer.

A trailer constructed in accordance with the present invention includes an elongated deck having a forward end and a rear end, and an undercarriage including an undercarriage frame and a plurality of ground-engaging wheels rotatably mounted on the undercarriage frame. Undercarriage shifting means are provided for selectively shifting the undercarriage along the elongated deck, and deck support means are mounted on the undercarriage for supporting the deck by the undercarriage. The deck support means includes lifting means for lifting the elongated deck assembly relative to the undercarriage. This lifting means is operable independently of the undercarriage shifting means for lifting the deck relative to the undercarriage without simultaneously shifting the undercarriage along the deck.

In accordance with another aspect of the invention, a trailer for use in connection with a towing vehicle having a fifth wheel includes hitch means for permitting the trailer to be pivotally connected to the towing vehicle. The hitch means includes a lower plate having a hitch pin adapted to engage the fifth wheel and an upper plate connected to the forward deck. The upper plate is pivotally connected to the lower plate for pivotal movement relative to the lower plate about a horizontal axis to permit the forward deck to be tilted away from the main deck to increase the angle between the main deck and the forward deck when the trailer is in the unloading position. The plates may be secured to the trailer in any of a number of positions such that the pin is properly positioned to provide a desired swing clearance and weight transfer to the prime mover.

According to a further aspect of the invention a trailer includes deck angle adjustment means for adjusting the relative positions of a plurality of decks. The deck angle adjustment means includes a timing link having a first end pivotally mounted on the main deck and a second end remote from the first end, the timing link being pivotally connected to the forward deck at a point intermediate the first and second ends. A fluid actuated cylinder including a cylinder and a piston is also provided, with one end of the cylinder and piston being pivotally connected to the swing deck and the other end of the cylinder and piston being pivotally connected to the second end of the timing link so that actuation of the cylinder assembly results in movement of the swing deck and main deck relative to the forward deck.

BRIEF DESCRIPTION OF THE DRAWING FIGURES

A preferred embodiment of the invention is discussed in detail below with reference to the attached drawing figures, wherein.

DETAILED DESCRIPTION OF THE PREFERRED EMBODIMENT

Figure 1:
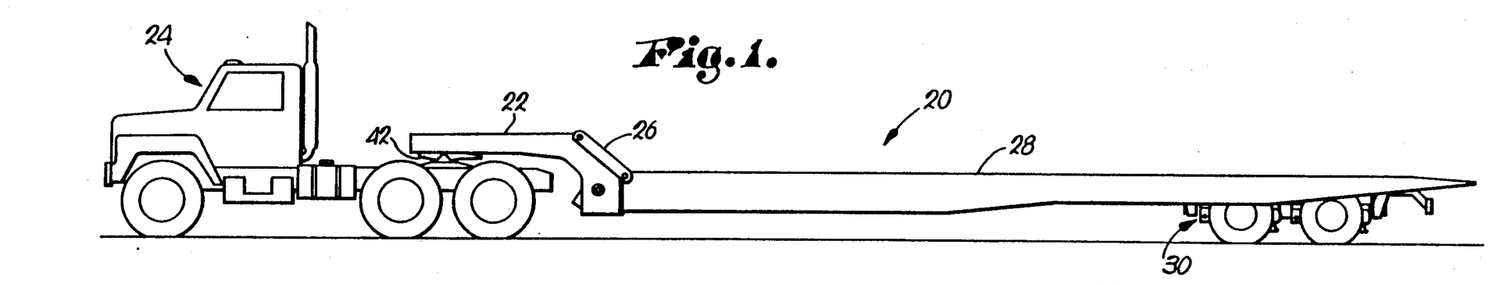
FIG. 1 is a side elevational view of a towing vehicle and trailer in a roading position.
Figures 2, 4:
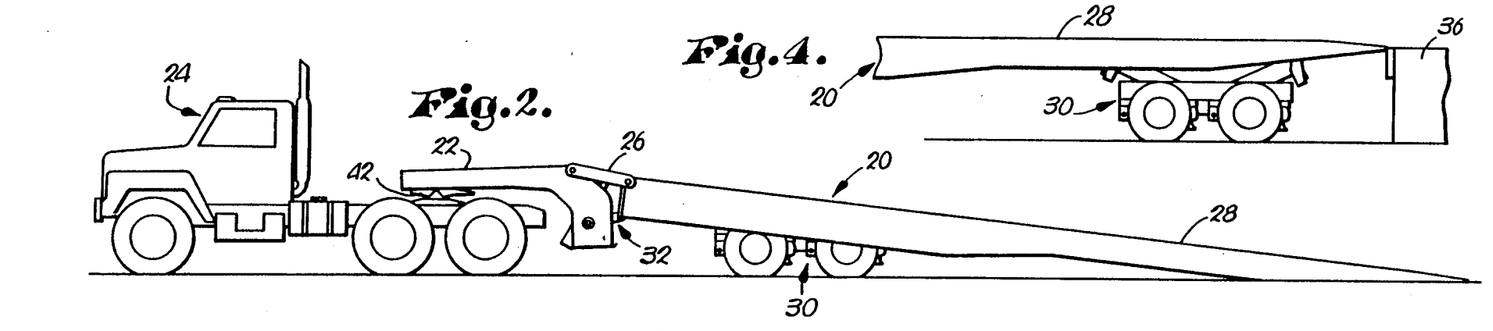
FIG. 2 is a side elevational view of the towing vehicle and trailer in a minimum angle loading position.
FIG. 4 is a fragmentary side elevational view of a trailer raised to the level of a loading dock.
Figure 3:
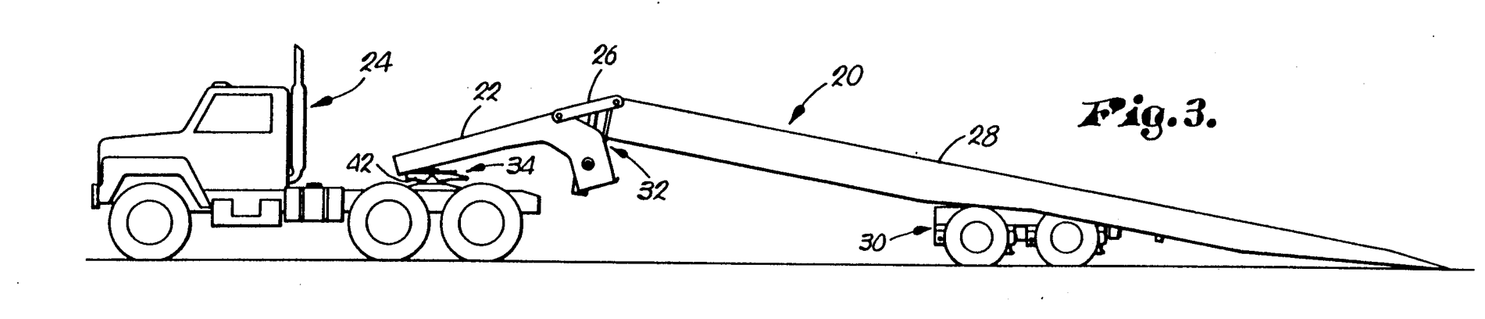
FIG. 3 is a side elevational view of the towing vehicle and trailer in a high angle position.

A trailer constructed in accordance with the present invention is illustrated in FIGS. 1–3, hitched to a towing vehicle having a fifth wheel. In FIG. 1, the trailer 20 is illustrated in a roading position for transporting a load such as farm machinery, truck tractors, buses and the like between two destinations. The trailer 20 includes a forward deck 22 hitched to the towing vehicle 24, an intermediate swing deck 26, and a main deck 28 including an undercarriage 30 positioned adjacent the rear end thereof on which the trailer is supported for transportation.

Figure 7:
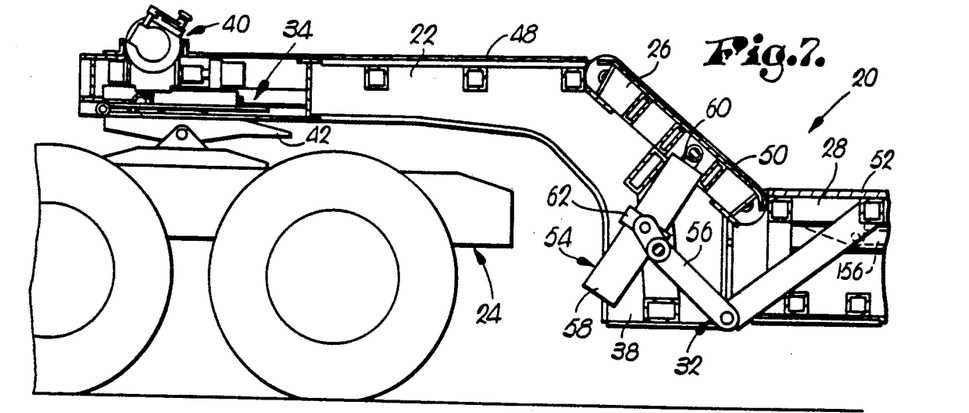
FIG. 7 is a fragmentary irregular vertical sectional view of the structure shown in FIG. 5, with the trailer in the roading position.
Figure 8:
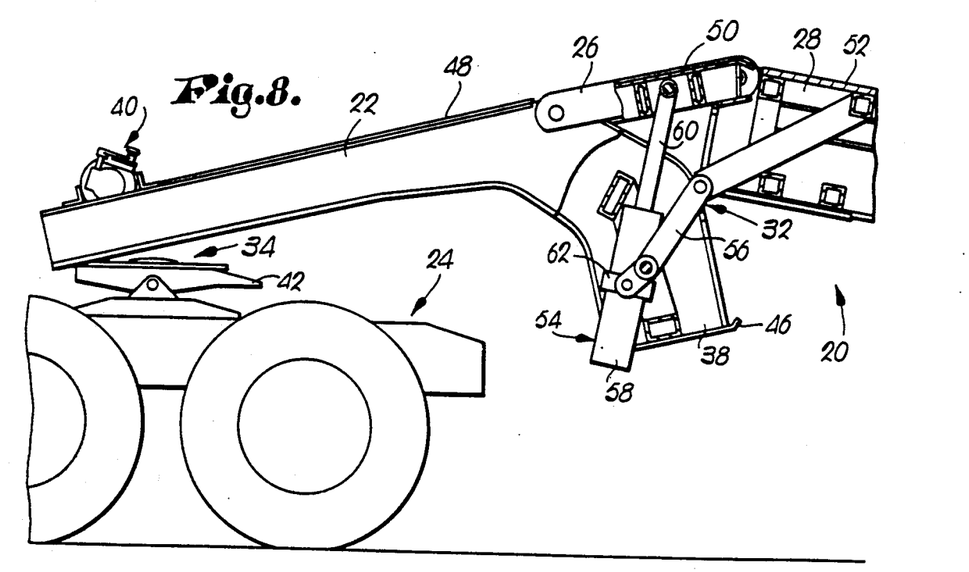
FIG. 8 is a fragmentary irregular vertical sectional view of the structure shown in FIG. 5, with the trailer in the high angle position.
Figure 9:
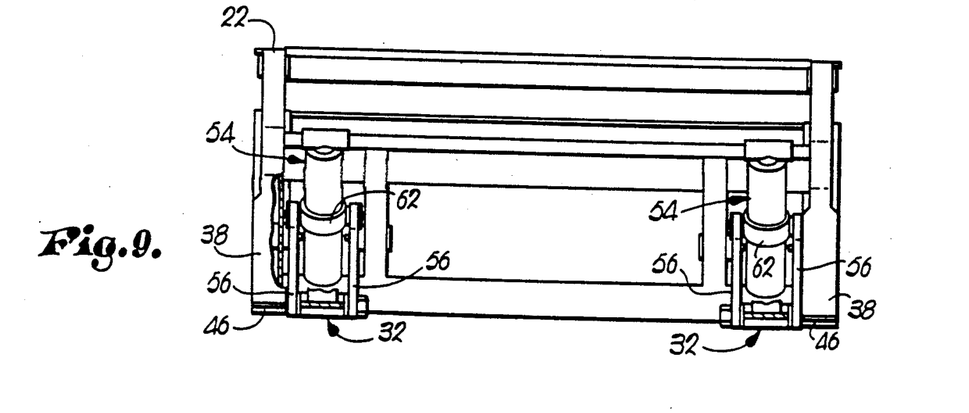
FIG. 9 is a rear elevational view of the forward deck with the swing deck removed to illustrate the hydraulic cylinders mounted in the forward deck.

The undercarriage 30 is constructed to be selectively shiftable relative to the main deck 28 between the positions shown in FIGS. 1 and 2. In FIG. 2, the undercarriage 30 is illustrated in the forwardmost position thereof which permits the rear end of the main deck 28 to be lowered into contact with the ground while maintaining the lowest possible angle between the ground and the main deck. A linkage assembly 32, discussed below with reference to FIGS. 7–9, is provided on the trailer 20 for moving the forward, intermediate and main decks between the positions shown in FIGS. 1–3, and is actuated during loading to move the intermediate and main decks to the positions shown in FIG. 2.

A maximum angle position of the trailer 20 is shown in FIG. 3, wherein the linkage arrangement 32 is actuated to position the intermediate deck 26 in line with the forward deck 22 so that the main deck 28 is disposed at the greatest angle possible relative to the ground. The trailer may be moved to this maximum angle position either when it is desired to unload dead weight which is not easily removed from the trailer at lower deck angles, or during loading when it is necessary to lift the main deck during shifting of the undercarriage 30 from the forward, loading position shown in FIG. 2, toward the rearward, roading position of FIG. 1.

As discussed below, when the trailer 20 is oriented in the maximum angle position during a loading operation thereof, the load on the deck 28 is removed from the undercarriage 30, thus enabling shifting of the undercarriage toward the rear of the main deck. In addition, a hitch assembly 34 is provided which permits the forward deck 22 to be tilted relative to the towing vehicle 24 to further increase the angle between the main deck 28 and the ground in the maximum angle position. This hitch assembly 34 is discussed with reference to FIGS. 10 and 11.

In addition to providing the range of angular adjustment of the trailer decks 22, 26, 28 illustrated in FIGS. 1–3, the decks of the trailer may also be lifted as a unit relative to the undercarriage 30 to position the main deck 28 level with a loading dock 36 or other elevated loading or unloading site. This position of the trailer 20 is shown in FIG. 4, and the lifting assembly enabling this movement of the trailer is discussed below with reference to FIGS. 12–16.

Figure 5:
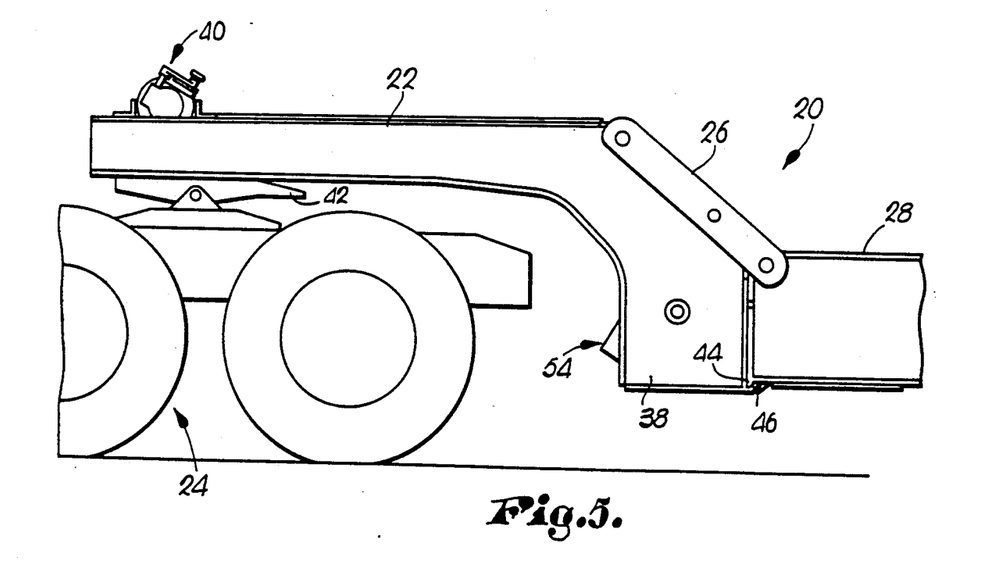
FIG. 5 is a fragmentary side elevational view of the forward and swing decks of the trailer and the rear end of the towing vehicle.

The forward and intermediate decks 22, 26 are illustrated in detail in FIG. 5 along with a portion of the main deck 28. As shown in the figure, the forward deck is a goose-neck shaped deck having a rear end 38 which turns downward from the upper surface of the deck 22. At the front end of the forward deck, a winch 40 is preferably provided for pulling heavy dead loads onto the trailer. Also, the hitch assembly 34, shown in FIG. 7, is provided at the lower side of the front end for attachment to the fifth wheel 42 of the towing vehicle 24.

The intermediate swing deck 26, is constructed of a width substantially equal to the width of the forward deck 22 and is pivotally connected to the forward deck for movement between the roading position shown in FIG. 5 and the maximum angle position shown in FIGS. 3 and 8. In all positions of the swing deck 26, the upper surface of the swing deck is disposed adjacent the upper surface of the forward deck so that a substantially continuous surface is presented to a load travelling along the trailer decks.

The rear end of the intermediate deck 26 is also pivotally connected to the main deck 28 to present a substantially continuous upper surface between the intermediate and main decks regardless of their relative positions. Further, the main deck 28 includes a flange or rib 44 extending downward from each lateral side of the front end of the main deck 28 which engages a lower upturned edge 46 of the forward deck in the roading position of the trailer.

Figure 6:
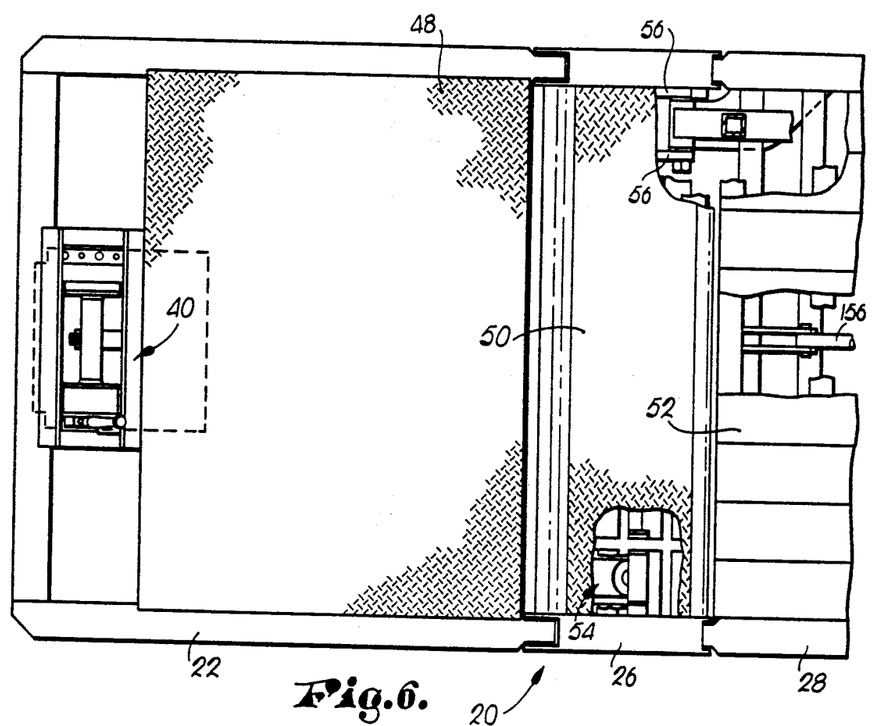
FIG. 6 is a fragmentary top plan view of the structure shown in FIG. 5.

The upper surfaces 48, 50, 52 of the forward, intermediate and main decks are illustrated in FIG. 6. As mentioned, the forward and intermediate decks 22, 26 are of substantially equal width and are provided with upper surfaces 48, 50 capable of supporting a desired load thereon. The main deck is also of a width equal to that of the other decks and includes a surface 52, e.g. planked wood, which extends over the support structure of the main deck.

The linkage assembly 32 which moves the three decks into the various positions shown in FIGS. 1–3 is illustrated in FIGS. 7–9. In FIG. 7, the linkage assembly 32 is shown in the roading position and includes a hydraulic cylinder mechanism 54 mounted on the forward deck 22 by a pair of timing links 56. The cylinder mechanism 54 includes a cylinder 58 and a piston 60, and is pivotally connected at the piston end thereof to the intermediate deck 26. The hydraulic cylinder 58 of the mechanism is also mounted for pivotal movement. However, instead of being mounted directly to the forward deck 22, the cylinder 58 is mounted in a collar 62 for pivotal movement on the timing links 56, which are in turn pivotally supported on the forward deck 22.

As shown, each timing link 56 is a rigid, elongated, irregular-shaped link having a pair of link segments. The first link segment extends between the axis about which the link 56 is pivotally supported on the main deck 28 and the axis about which the link is pivotally supported on the forward deck 22, and the second link segment is defined between the axis about which the link is supported on the forward deck 22 and the axis about which the hydraulic cylinder 58 is pivotally supported on the pair of links 56. In the preferred embodiment, as shown in FIG. 9, two hydraulic cylinder mechanisms 54 are used in the trailer and two pairs of timing links 56 support the cylinder mechanisms between the forward and intermediate decks.

In FIG. 8, the trailer 20 is illustrated in the maximum angle position with the upper surface 50 of the intermediate deck 26 disposed substantially coplaner with the upper surface 48 of the forward deck 22. When it is desired to move the trailer decks toward this high angle position, the hydraulic cylinder 58 is actuated to move the intermediate deck 26 away from the lowered position shown in FIG. 7, while at the same time lifting the forward end of the main deck 28. By mounting the cylinder mechanism 54 on the timing links 56 in the manner shown in the figures, it is possible to increase the efficiency of the linkage assembly 32 since during elongation of the mechanism 54, the upward movement of the piston 60 relative to the cylinder 58 raises the intermediate deck 26 and the downward movement of the cylinder 58 and collar 62 lifts the forward end of the main deck 28. Further, due to the provision of the hitch assembly 34, which permits pivotal movement of the forward deck 22 relative to the towing vehicle, it is possible to further increase the angle between the forward and main decks in the maximum angle position so as to increase the angle between the main deck 28 and the ground.

Figure 10:
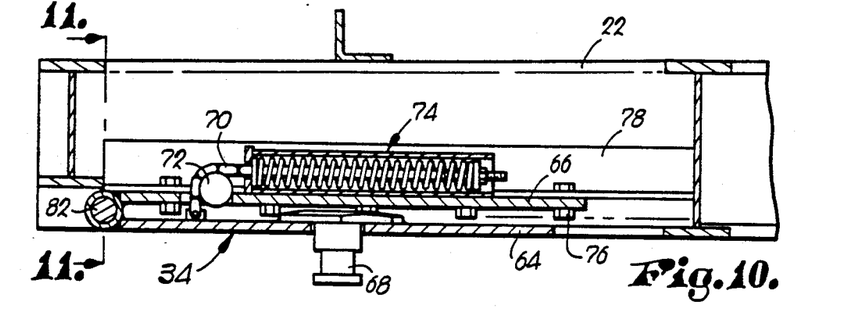
FIG. 10 is a fragmentary longitudinal vertical sectional view of the hitch assembly at the front end of the forward deck.

The hitch assembly 34 is shown in detail in FIG. 10, and includes a lower hitch plate 64 pivotally connected along a front edge thereof to an upper hitch plate 66 attached to the forward deck 22. The lower hitch plate 64 includes a pin 68 welded or otherwise attached thereto extending beneath the plate for engagement with the fifth wheel 42 of the towing vehicle 24, as shown in FIG. 7. A chain 70 is connected at one end to the lower hitch plate 64 and extends through an opening in the upper plate 66 and over a roller 72. The chain 70 is connected at a second end to a spring assembly 74 which maintains a predetermined tension on the chain so that, when the hitch assembly is left unattached from the fifth wheel 42 of the towing vehicle, the lower hitch plate 64 is raised into a storage position in close contact with the forward deck 22.

Figure 11:
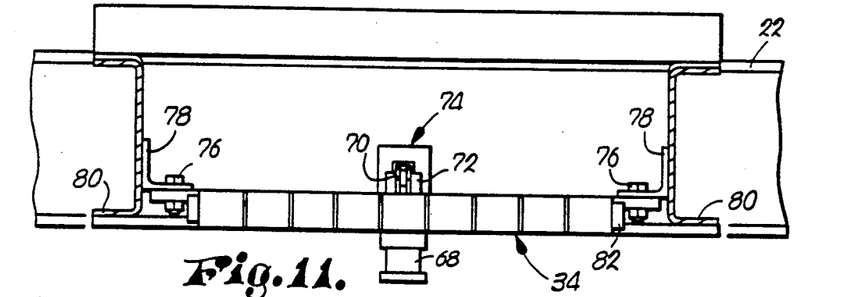
FIG. 11 is a fragmentary vertical cross-sectional view taken along line 11—11 of FIG. 10.

As shown in FIG. 11, the upper hitch plate 66 is secured to the forward deck 22 by a plurality of fasteners 76 passing through both the upper hitch plate 66 and one of a pair of L-shaped mounting bars 78 provided in a lower opening of the forward deck 22. The lower hitch plate 64 which is wider than the upper plate 66, is retained in contact with a pair of flanges 80 of the support structure of the forward deck which serve as upper limit stops for the lower hitch plate 66.

When the linkage assembly 32 moves the intermediate deck 26 toward the maximum angle position shown in FIG. 3, the rear end of the main deck 28 contacts the ground thus limiting further angular movement of the main deck relative to the horizontally disposed forward deck 22. Thereafter, as can be seen from FIG. 8, further angular movement of the main deck 28 relative to the forward deck 22 causes the forward deck to tilt relative to the towing vehicle 24 by pivoting away from the main deck 22 about the axis defined by the pivot pin 82, shown in FIG. 10, of the hitch assembly 34. Thus, the range of motion of the main deck 22 is not limited to that which would be permitted if the forward deck were disposed in a fixed horizontal orientation, but is increased to include all angles between the low load angle shown in FIGS. 2 and 7, and the large angle illustrated in FIGS. 3 and 8. In the preferred embodiment, the low load angle is approximately 6.25 degrees and the maximum unload angle is 10 degrees.

Figure 16:
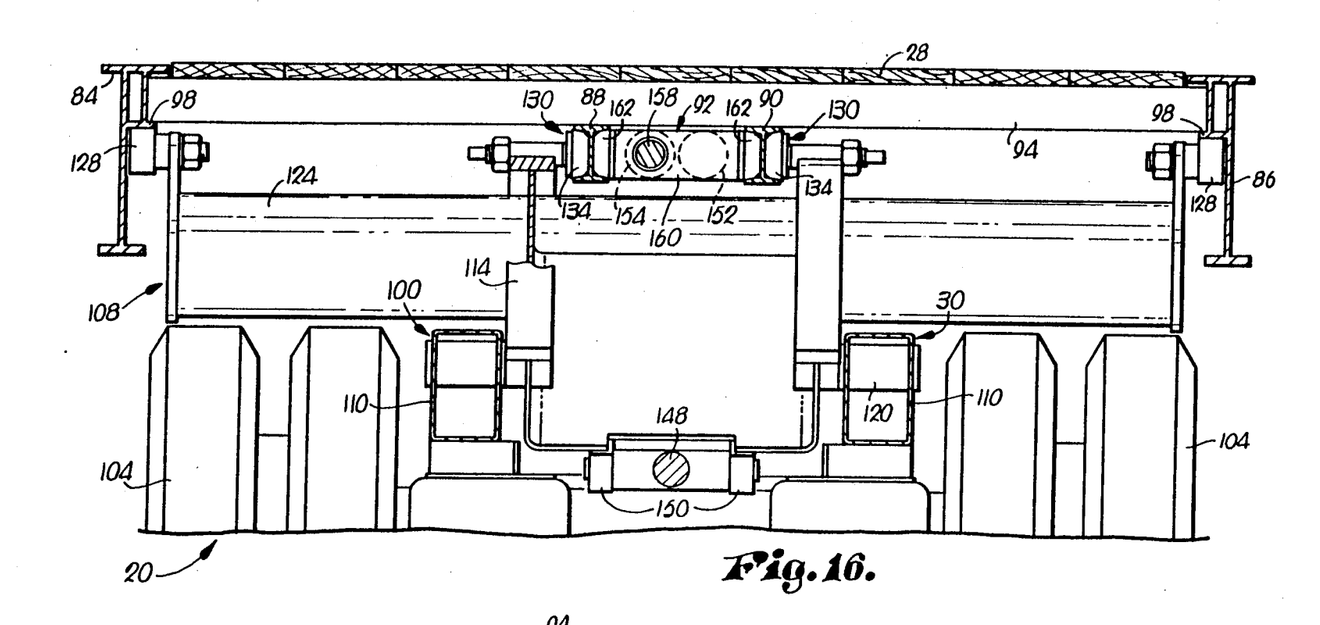
FIG. 16 is a vertical cross-sectional view of the main deck and undercarriage taken intermediate the lifting arms of the deck lifting assembly and showing the deck in a raised position relative to the undercarriage.

The construction of the main deck 28 is illustrated in FIG. 16, and includes two main support I-beams 84, 86 extending longitudinally of the trailer along the lateral sides thereof, and a pair of centrally located longitudinal I-beams 88, 90 each providing two guide channels in which the undercarriage 30 and an undercarriage shifting assembly 92 are received. A number of cross-members 94, 96, shown in FIG. 12, extend between the sides of the main deck 28. As shown in FIG. 16, these cross-members extend between the main I-beams 84, 86 and are disposed vertically above the guide beams 88, 90 so that the guide beams present uncluttered guide paths to the undercarriage and shifting assemblies. In addition, the main I-beams 84, 86 are each provided with a bearing flange 98 extending laterally inward thereof along the bottoms of the cross-members 94, 96, and defining guide surfaces for engagement by the undercarriage 30.

Figure 12:
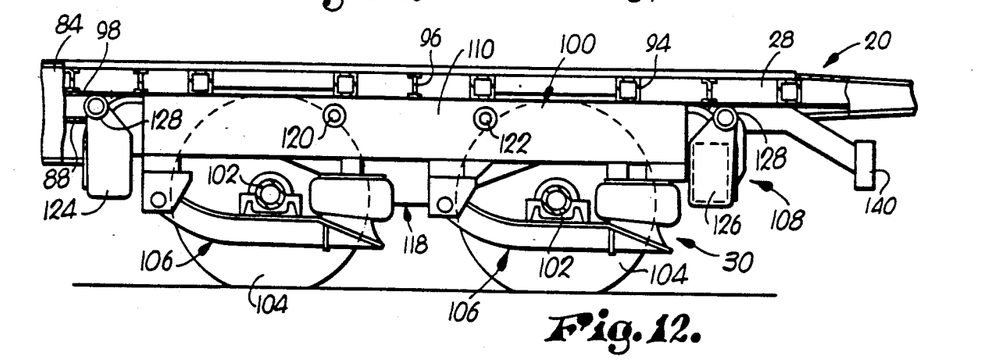
FIG. 12 is a longitudinal vertical sectional view of the main deck and undercarriage of the trailer with the deck shown in a lowered roading position.

The shiftable undercarriage 30 of the trailer is shown in various positions of the trailer in FIGS. 12-15. The construction of the undercarriage 30 is illustrated in FIG. 12, and includes a frame 100 on which two axles 102 supporting a plurality of wheels 104 are suspended by a pair of air suspension assemblies 106. Although air-type suspension assemblies are illustrated in the figures, it is understood that a spring-type suspension could also be employed without departing from the scope of the invention. In either case, the wheels 104 and suspension assemblies 106 form a part of frame 100, and the entire undercarriage 30 is separable from the main deck 28 of the trailer but for a lifting arm assembly 108 discussed below, which is pivotally mounted on the undercarriage 30 and which is shiftable with the undercarriage 30 relative to the main deck 28.

Figure 13:
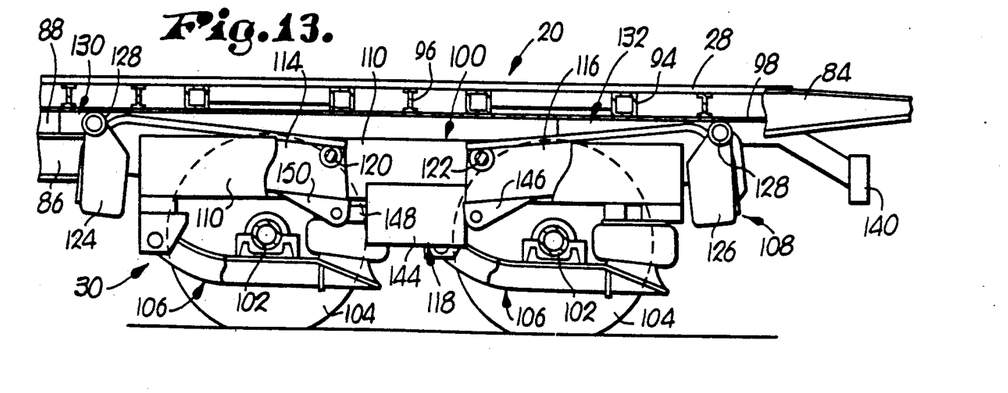
FIG. 13 is a longitudinal vertical sectional view of the main deck and undercarriage of the trailer with the deck shown in a raised undercarriage-shifting position.
Figure 15:
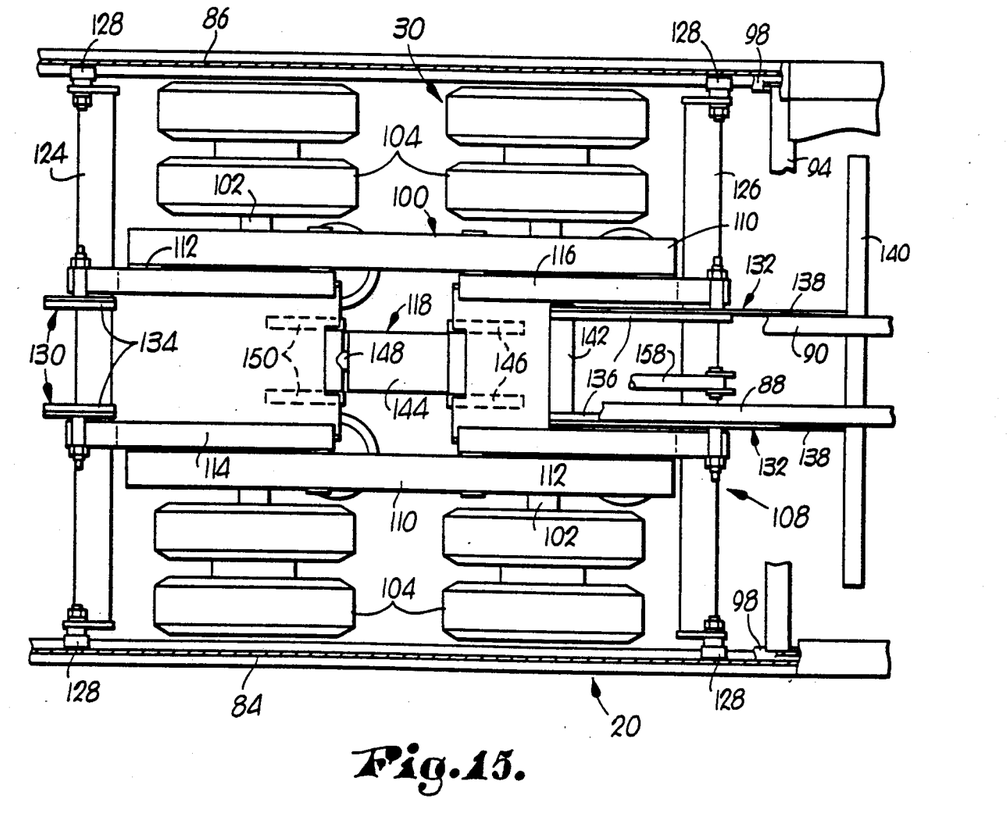
FIG. 15 is a top plan view of the undercarriage including a portion of the structure of the main deck.

Turning to FIG. 15, the undercarriage frame 100 is illustrated as including a pair of parallel longitudinal members 110 disposed laterally inward of the wheels and connected together by transverse cross-members 112. The open center of the frame 100 forms a cradle in which the lifting assembly 108 is disposed. As shown in FIG. 13, the lifting assembly includes a pair of channel-shaped lifting arms 114, 116 arranged in opposition to one another on the undercarriage frame 100, and a hydraulic cylinder mechanism 118 extending between the lifting arms 114, 116. Each of the lifting arms is pivotally secured between the two longitudinal frame members 110 for pivotal movement about a pivot axis 120 or 122 which is spaced from the pivot axis of the other arm in the longitudinal direction of the frame 100 and the two pivot axes 120, 122 are centrally disposed between the axles 102 of the undercarriage 30 such that any load applied to the frame 100 at the pivot axes 120, 122 is evenly distributed between the two axles 102.

The lifting arms 114, 116 engage the main deck 28 of the trailer through lateral beams 124, 126 formed at the longitudinally outer ends of the lifting arms remote from the pivot connections of the arms to the undercarriage frame 100. As shown in FIG. 15, the lateral beams 124, 126 of the lifting arms 114, 116 extend between the laterally displaced I-beams 84, 86 of the main deck 28, and each of the beams includes a pair of rollers 128 adapted to engage the bearing flanges 98 of the I-beams 84, 86 to permit rolling contact between the lifting arms and the main deck. By constructing the lifting arms in this manner, the undercarriage 30 moves together with the lifting assembly 108 along the main deck 28 of the trailer between a rearward roading position shown in FIG. 1 and loading and unloading positions such as those illustrated in FIGS. 2 and 3. This shifting of the undercarriage 30 and lifting assembly 108 is possible regardless of the height of the deck 28 relative to the undercarriage 30 such that the shifting movement of the undercarriage may be carried out independently of the lifting movement performed by the lifting assembly 108.

Also provided on each of the lateral beams 124, 126 of the lifting arms 114, 116 are a pair of guiding assemblies 130, 132. As shown in FIG. 16, each one of the assemblies 130 provided on the forward lifting arms 114 includes a bearing pad 134 adapted to travel within one of the spaces defined by the laterally outer flanges of one of the guide beams 88, 90. In addition, the forward bearing pads 134 are pivotally supported on the lateral beam 124 of the lifting arms 114 so that the lifting arms may pivot relative to the pads 134 during relative vertical movement between the undercarriage 30 and the main deck 28 while retaining the lifting arms 114 in engagement with the main deck 28.

The bearing pads 136 provided on the rear lifting arm 116, illustrated in FIG. 15, are each mounted on a pad support bar 138 which extends rearward of the undercarriage 30 to provide a mounting for a tailight assembly 140 including a transverse bumper and a number of lights. The support bars 138 are pivotally supported on the lateral beam 126 of the rear lifting arms 116 so that the rear lifting arms may pivot relative to the pads 136 and tailight assembly 140 during relative movement between the undercarriage 30 and the main deck 28. A cross-member 142 extends between the forward ends of the support bars 138 to give the bars stability for supporting the tailight assembly 140 and the pads 136 used on the rear lifting arms 116 are substantially longer than the pads 134 used on the forward lifting arm 114 to assist in supporting the tailight assembly 140.

Figure 14:
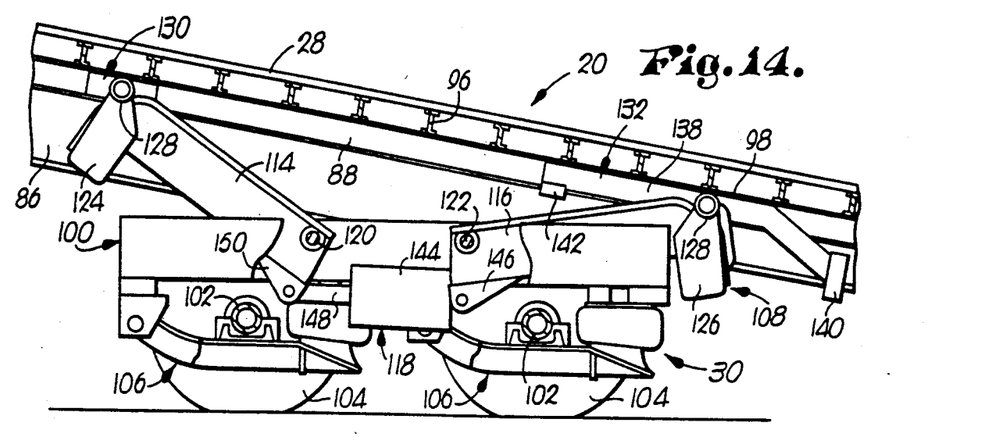
FIG. 14 is a longitudinal vertical sectional view of the main deck and undercarriage of the trailer with the deck shown in an angled position relative to the undercarriage.

As illustrated in FIG. 13, the hydraulic cylinder mechanism 118 of the lifting assembly 108 includes a cylinder 144 pivotally supported on a pair of depending mounting lugs 146 on the rear lifting arm 116, and a piston 148 pivotally mounted to the forward lifting arm 114 through depending mounting lugs 150 of the forward arm. The cylinder mechanism 118 is vertically displaced from the pivot axes 120, 122 of the lifting arms 114, 116 so that any relative movement between the cylinder 144 and piston 148 of the mechanism effects an angular displacement of the lifting arms 114, 116 relative to the frame 100 of the undercarriage 30. In addition, as shown in FIG. 15, the cylinder mechanism 118 is centrally disposed between the sides of the lifting arms 114, 116 so as to define a rigid intermediate link between the arms when the mechanism is retained in any given position. By connecting the lifting arms 114, 116 and cylinder mechanism 118 to the undercarriage frame 100 in this manner, it is possible for all of the wheels 104 of the undercarriage to remain in contact with the ground even when the main deck 28 is angled during a loading or unloading operation as shown in FIG. 14, and the weight of the deck 28 and the load thereon are distributed evenly between the two pivot axes 120, 122 and thus, the two axles 102.

Figure 17:
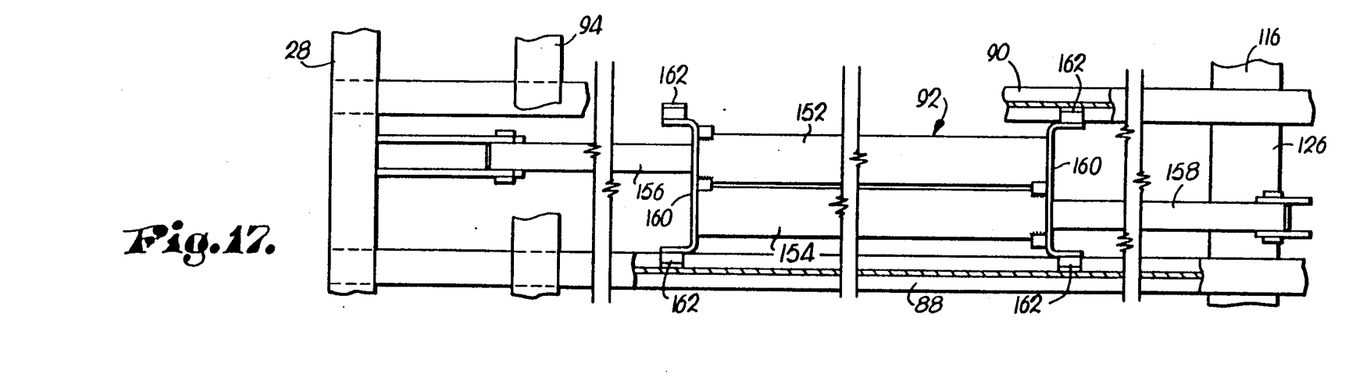
FIG. 17 is a fragmentary top plan view of the main deck and undercarriage showing the hydraulic cylinder assembly used for shifting the undercarriage longitudinally along the main deck.

The undercarriage shifting assembly 92 is used to shift the undercarriage 30 between the roading position shown in FIG. 1 and the loading position shown in FIG. 2. The shifting assembly is illustrated in FIG. 17, and includes a pair of cylinders 152, 154 connected together in side-by-side relation and mounted for sliding movement along the guide beams 88, 90, a forward extending piston 156 connected to the main deck 28 at the forward end of the main deck, and a rearward extending piston 158 connected to the lateral beam 126 of the rear lifting arm 116 as shown in FIG. 15. The cylinders 152, 154 are attached to a pair of end plates 160 having holes through which the pistons 156, 158 extend, and are provided with opposed bearing pads 162, each of which is received between the laterally inner flanges of one of the guide beams 88, 90 in the manner illustrated in FIG. 16. Thus, the shifting assembly 92 is retained adjacent the main deck 28 while being shiftable between extended and retracted positions.

The loading operation of the trailer 20 is as follows. Normally, when the trailer is in the roading position, as shown in FIG. 1, the main deck 28 is in a lowered position such that the wheels 104 of the undercarriage 30 extend vertically to a height greater than the vertical height of the lower surfaces of the cross-members 94, 96. In this manner, the overall height of the main deck in the roading position is maintained at a minimum height which permits the trailer to be used in transporting very tall machines without violating state and federal height restrictions while maintaining a flat deck.

When a loading operation is to be carried out, however, the main deck 28 is lifted relative to the undercarriage 30 by the lifting arm assembly 108 through actuation of the cylinder mechanism 118 extending between the lifting arms 114, 116. This lifting of the main deck 28 permits the undercarriage 30 to clear the cross-members 94, 96 so that the undercarriage may be shifted toward the forward position shown in FIG. 2 without interference from the deck structure. Although not shown in the figures, it is possible to provide a locking mechanism which will prevent any shifting movement of the undercarriage from its rearward roading position unless the deck has been lifted by a sufficient distance relative to the undercarriage to provide unrestricted shifting of the undercarriage. For example, a shut-off valve may be provided in the hydraulic circuit of the undercarriage shifting assembly 92 which remains closed and prevents the assembly from operating when the deck has not been lifted by a sufficient distance to permit free shifting of the undercarriage. A magnetically actuated switch or the like may be provided between the undercarriage and the main deck at the rear end or roading position of the deck such that the switch is actuated by movement of the deck relative to the undercarriage through a predetermined distance. Once the switch is actuated, the shut-off valve is opened rendering the shifting assembly operable.

Once the deck 28 has been lifted by a predetermined amount, which is about 5 inches in the preferred construction of the invention, the undercarriage 30 is shifted by retracting the pistons 156, 158 of the shifting assembly 92. At the same time, the hydraulic cylinder mechanism 54 of the linkage assembly 32 is actuated to extend the piston 60 and move the swing deck 26 and main deck 28 toward the position shown in FIG. 2. In addition, once the undercarriage 30 is at its forward position, the piston 148 of the lifting assembly cylinder mechanism 118 is retracted to drop the main deck 28 back to a lowered position relative to the undercarriage 30.

By extending the effective length of the deck 28 to include the intermediate deck 26, and by moving the undercarriage 30 far enough forward of the trailer to be received in the available space beneath the trailer, the main deck 28 may be disposed at an angle to the ground of about 6.25 degrees, which is less than the known trailers disclosed in the background of the invention. The benefit to providing such a construction resides in the ability of the trailer to be used in transporting machinery such as harvesting equipment which has a very low ground clearance and which includes components that frequently extend far forward of the front wheels thereof so as to make loading onto an inclined surface difficult.

Once the machinery to be loaded is driven onto the trailer or is pulled onto the trailer by the winch 40, the trailer is returned to the roading position of FIG. 1. Normally, the return movement of the trailer components is identical but reversed from the movements used to position the trailer in the loading position. However, when an extremely heavy piece of equipment is loaded on the trailer, it may be necessary to walk the undercarriage 30 back to the roading position in order to prevent the towing vehicle 24 from being lifted from the ground.

As can be appreciated from an examination of FIG. 2, it is possible for the center of gravity of a large machine on the trailer to be located at a position to the rear of the undercarriage 30 by a distance sufficient to cause the towing vehicle 24 to be lifted from the ground as the under carriage 30 is shifted toward the roading position of FIG. 1. Such an occurance may be undersirable in certain circumstances where it is important to maintain the orientation of the trailer, since it is possible that the towing vehicle 24 will become turned or skewed relative to the trailer 20 when the wheels of the towing vehicle are lifted and will cause the trailer to move out of a desired alignment with the machine being loaded. In order to avoid lifting of the towing vehicle 24, it is possible to walk the undercarriage 30 back to the roading position.

Once the machine has been driven or pulled onto the trailer, the linkage assembly 32 is further actuated to move the decks 22, 26, 28 toward the positions shown in FIG. 3. By lifting the front end of the main deck 28 toward the position shown, a substantial portion of the load on the undercarriage is relieved so that the undercarriage may be shifted rearward to a position where the weight of the trailer and the load again threatens to lift the towing vehicle from the ground.

Thereafter, the linkage assembly 32 may be further actuated toward the position of FIG. 3 to further relieve the weight from the undercarriage 30, and the undercarriage may again be moved toward the roading position. Once the load is centered to the front of the undercarriage 30, the linkage assembly 32 and the undercarriage may be returned to the position shown in FIG. 1, and the decks 22, 26 and 28 may be lowered into the roading position. In this manner, the trailer 20 may be moved from the low angle loading position to the horizontal roading position with any sized load without causing or requiring the towing vehicle to be raised off the ground at any time.

Once the machine to be unloaded has been transported to the desired location, the unloading operation may follow either of two procedures. If the load is a dead load, i.e. one incapable of being driven from the trailer, the main deck 28 is first raised relative to the undercarriage 30 in the same manner as when the trailer is being loaded, and the undercarriage 30 is shifted by the shifting assembly 92 toward the forward position shown in FIG. 3. Simultaneously, the linkage assembly 32 is actuated to move the swing deck 22 to the extreme position shown in FIG. 3 so that the swing deck is substantially coplaner with the forward deck 22 and the main deck 28 is disposed at the greatest possible angle relative to the ground. In this manner, the load is inclined at a large angle which eases the unloading operation.

Alternately, if it is possible to drive the load from the trailer, then the trailer may be oriented in the low angle position of FIG. 2, in the manner discussed above, and the machine drive therefrom.

Upon both loading and unloading of the trailer, all of the wheels 104 of the undercarriage 30 are maintained in contact with the ground at all times and the weight of the deck 28 and the load is distributed evenly between the two axles 102. As shown in FIG. 14, any weight exerted on the undercarriage 30 by the main deck 28 when the deck is angled relative to the undercarriage is delivered to the undercarriage through the two lifting arms 114, 116 and the hydraulic cylinder mechanism 118, each of which acts as a link in a free-floating linkage beneath the main deck 28. When weight is applied to this linkage, it is carried equally by each of the links and is thus distributed evenly between the two pivot axes 120, 122 at which the lift arms 114, 116 are attached to the undercarriage frame 100. The weight of the trailer and the machinery thereon is thus distributed evenly to all of the wheels 104 of the undercarriage, and the possibility of overloading one of the axles 102 is eliminated.

Further, when the undercarriage is being shifted from a loading position toward the roading position with a heavy load, and the ground beneath the trailer is soft, the even distribution of the load carried out by the construction of the lifting assembly 108 prevents the wheels of the rear axle from bearing the brunt of the load and becoming plowed into the ground. Instead, both axles move rearward together in the same plane as the ground so that all of the wheels bear on the ground with substantially the same force.

In order to load or unload the trailer 20 at a loading dock or the like, as shown in FIG. 4, the trailer is backed up to the dock 36 and the main deck 28 is simply raised to the proper height by the cylinder mechanism 118 of the lifting assembly 108, and the machine loaded or unloaded therefrom. Thus, by providing a lifting assembly in accordance with the present invention, it is possible to lift the deck 28 independently of the position of the undercarriage 30 and shifting assembly 92 and to permit either dock loading or road level loading without the need for additional trailer lifting hardware.

Although the invention has been described with reference to the illustrated preferred embodiment, it is noted that substitutions may be made and equivalents employed herein without departing from the scope of the invention as set forth in the claims.

What is claimed is:

1. A shiftable undercarriage for use in supporting the deck of a trailer movable between a horizontal position and an angled position, the undercarriage comprising
   an elongated undercarriage frame having forward and rear ends;
   a first axle supported on the frame adjacent the forward end and extending transverse to the frame;
   a second axle supported on the frame adjacent the rear end and extending in a direction parallel to the first axle;
   a plurality of wheels rotatably supported on each of the axles; and
   load distribution means mounted on the undercarriage frame for evenly distributing the weight of the deck between the first and second axles, the load distribution means including a floating link assembly having opposing first and second support arms and an intermediate link, each having first and second ends, the second ends of the support arms including bearing means adapted to engage the main deck for transmitting weight of the deck to the support arms,
   the undercarriage frame including a pair of horizontal pivot axes on which the support arms are supported, the pivot axes each extending in a direction parallel to the direction in which the first axle extends and defining with the other axis a midpoint halfway therebetween which is vertically aligned with a midpoint defined halfway between the axles, the intermediate link being connected between the first ends of the support arms in a direction substantially perpendicular to the horizontal pivot axes and being vertically offset from the pivot axes, the intermediate link further being movable relative to the undercarriage frame for transmitting the weight of the deck equally between the support arms regardless of the angle of the deck and for evenly distributing the weight of the deck between the axles of the undercarriage.

2. A trailer comprising:
   an elongated deck having a forward end and a rear end;
   an undercarriage including an undercarriage frame and a plurality of ground-engaging wheels rotatably mounted on the undercarriage frame;
   undercarriage shifting means for selectively shifting the undercarriage along the elongated deck; and
   deck support means mounted on and being movable with the undercarriage for supporting the deck on the undercarriage, the deck support means including a pair of lift arms connected between the elongated deck and the undercarriage frame, each of the lift arms including a first end connected to the undercarriage frame for pivotal movement about a horizontal axis and a second end provided with bearing means for supporting the main deck, and lifting means for lifting the elongated deck assembly relative to the undercarriage by pivoting the lift arms relative to the undercarriage, the lifting means including retaining means extending between the first ends of the lift arms at a position vertically spaced from the pivotal connections of the link arms to the undercarriage frame for retaining the lift arms in any given position relative to the undercarriage regardless of the position of the undercarriage relative to the elongated deck, and being operable independently of the undercarriage shifting means for lifting the deck relative to the undercarriage without simultaneously shifting the undercarriage along the deck.

3. A trailer comprising:
   an elongated deck having a forward end and a rear end;
   an undercarriage including an undercarriage frame and a plurality of ground-engaging wheels rotatably mounted on the undercarriage frame;
   undercarriage shifting means for selectively shifting the undercarriage along the elongated deck; and
   deck support means mounted on and being movable with the undercarriage for supporting the deck on the undercarriage, the deck support means including a pair of lift arms connected between the elongated deck and the undercarriage frame, each of the lift arms including a first end connected to the undercarriage frame for pivotal movement about a horizontal axis and a second end provided with bearing means for supporting the elongated deck and lifting means for lifting the elongated deck relative to the undercarriage, the lifting means being operable independently of the undercarriage shifting means for lifting the deck relative to the undercarriage without simultaneously shifting the undercarriage along the deck;
   the deck support means including link means extending between the first ends of the lift arms at a position vertically spaced from the pivotal connections of the link arms to the undercarriage frame for transferring forces between the lift arms so that any load applied to one of the lift arms is transferred through the lift arm link means to the other lift arm and is distributed equally to the pivotal connections of the link arms.

4. The trailer as set forth in claim 3, wherein the link means includes a fluid actuated extendable link and the lifting means includes actuation means for actuating the extendable link to pivot the lift arms about their horizontal axes to adjust the height of the deck relative to the undercarriage.

5. The trailer as set forth in claim 2, wherein the elongated deck includes a forward deck, a swing deck having a front end pivotally connected to the forward deck and a rear end, and an elongated main deck having an anterior end pivotally connected to the rear end of the swing deck, the trailer further comprising:
   deck angle adjustment means for adjusting the relative positions of the decks between a roading position in which the main deck is disposed in a horizontal plane and an unloading position in which the main deck is angled relative to the forward deck.

6. A trailer comprising:
   an elongated deck including a forward deck, a swing deck having a front end pivotally connected to the forward deck and a rear deck and a rear end, and an elongated main deck having an anterior end pivotally connected to the rear end of the swing deck;
   an undercarriage including an undercarriage frame and a plurality of ground-engaging wheels rotatably mounted on the undercarriage frame;

undercarriage shifting means for selectively shifting the undercarriage along the elongated deck;

deck support means mounted on and being movable with the undercarriage for supporting the deck on the undercarriage, the deck support means including lifting means for lifting the elongated deck assembly relative to the undercarriage, the lifting means being operable independently of the undercarriage shifting means for lifting the deck relative to the undercarriage without simultaneously shifting the undercarriage along the deck; and deck angle adjustment means for adjusting the relative positions of the decks between a roading position in which the main deck is disposed in a horizontal plane and an unloading position in which the main deck is angled relative to the forward deck, the deck angle adjustment means including a timing link having a first end pivotally mounted on the elongated main deck and a second end remote from the first end, the timing link being pivotally connected to the forward deck at a point intermediate the first and second ends, and a fluid actuated cylinder assembly including a cylinder and a piston, one of the cylinder and piston being pivotally connected to the swing deck and the other of the cylinder and piston being pivotally connected to the second end of the timing link so that actuation of the cylinder assembly results in movement of the swing deck and main deck relative to the forward deck.

7. The trailer as set further in claim 5, further comprising hitch means for permitting the trailer to be pivotally connected to the towing vehicle, the hitch means including a lower plate having a hitch pin adapted to engage the fifth wheel and an upper plate connected to the forward deck, the upper plate being pivotally connected to the lower plate for pivotal movement relative to the lower plate about a horizontal axis to permit the forward deck to be tilted away from the main deck to increase the angle between the main deck and the forward deck when the trailer is in the unloading position.

8. A trailer for use in connection with the towing vehicle having a fifth wheel, the trailer comprising:

a forward deck;

a swing deck having a front end and a rear end, the front end being pivotally connected to the forward deck;

an elongated main deck having an anterior end pivotally connected to the rear end of the swing deck;

deck angle adjustment means for adjusting the relative positions of the decks between a roading position in which the elongated main deck is disposed in a horizontal plane and an unloading position in which the main deck is angled relative to the forward deck, the deck angle adjustment means including a timing link having a first end pivotally mounted on the elongated main deck and a second end remote from the first end, the timing link being pivotally connected to the forward deck at a point intermediate the first and second ends, and a fluid actuated cylinder assembly including a cylinder and a piston, one of the cylinder and piston being pivotally connected to the swing deck and the other of the cylinder and piston being pivotally connected to the second end of the timing link so that actuation of the cylinder assembly results in movement of the swing deck and main deck relative to the forward deck;

an undercarriage supporting the elongated main deck and being shiftable longitudinally along the main deck, the undercarriage including a plurality of ground engaging wheels; and hitch means for permitting the trailer to be pivotally connected to the towing vehicle, the hitch means including a lower plate having a hitch pin adapted to engage the fifth wheel and an upper plate connected to the lower plate for pivotal movement relative to the lower plate about a horizontal axis to permit the forward deck to be tilted away from the main deck to increase the angle between the main deck and the forward deck when the trailer is in the unloading position.

9. The trailer as set forth in claim 8, wherein the undercarriage includes an undercarriage frame, the trailer further comprising deck support means mounted on the undercarriage for supporting the deck on the undercarriage, the deck support means including a pair of lift arms connected between the main deck and the undercarriage frame, each of the lift arms including a first end connected to the undercarriage frame for pivotal movement about a horizontal axis and a second end provided with bearing means for supporting the main deck.

10. The trailer as set forth in claim 8, wherein the deck support means includes link means extending between the first ends of the lift arms at a position vertically spaced from the pivotal connections of the link arms to the undercarriage frame for transferring forces between the lift arms so that any load applied to one of the lift arms is transferred through the lift arm link means to the other lift arm and is distributed equally to the pivotal connections of the link arms.

11. The trailer as set forth in claim 10, wherein the link means includes a fluid actuated extendable link and actuation means for actuating the extendable link to pivot the lift arms about their horizontal axes to adjust the height of the deck relative to the undercarriage.

12. A trailer comprising:

a forward deck;

a swing deck having a front end pivotally connected to the forward deck and a rear end;

an elongated main deck having a forward end pivotally connected to the rear end of the swing deck;

an undercarriage supporting the elongated main deck and being shiftable longitudinally along the main deck, the undercarriage including a plurality of wheels; and deck angle adjustment means for adjusting the relative positions of the decks, the deck angle adjustment means including a timing link having a first end pivotally mounted on the elongated main deck and a second end remote from the first end, the timing link being pivotally connected to the forward deck at a point intermediate the first and second ends, and a fluid actuated cylinder assembly including a cylinder and a piston, one of the cylinder and piston being pivotally connected to the swing deck and the other of the cylinder and piston being pivotally connected to the second end of the timing link so that actuation of the cylinder assembly results in movement of the swing deck and main deck relative to the forward deck.

13. The trailer as set forth in claim 12, wherein the undercarriage includes an undercarriage frame, the trailer further comprising deck support means mounted on the undercarriage for supporting the deck on the undercarriage, the deck support means including a pair of lift arms connected between the main deck and the undercarriage frame, each of the lift arms including a first end connected to the undercarriage frame for pivotal movement about a horizontal axis and a second end provided with bearing means for supporting the main deck.

14. The trailer as set forth in claim 13, wherein the deck support means includes link means extending between the first ends of the lift arms at a position vertically spaced from the pivotal connections of the link arms to the undercarriage frame for transferring forces between the lift arms so that any load applied to one of the lift arms is transferred through the lift arm link means to the other lift arm and is distributed equally to the pivotal connections of the link arms.

15. The trailer as set forth in claim 14, wherein the link means includes a fluid actuated extendable link and actuation means for actuating the extendable link to pivot the lift arms about their horizontal axes to adjust the height of the deck relative to the undercarriage.

16. The trailer as set forth in claim 2, further comprising a bumper assembly supported on the elongated deck and being movable longitudinally between the forward and rear ends of the deck with the undercarriage when the undercarriage is shifted by the undercarriage shifting means, the bumper assembly remaining substantially stationary relative to the elongated deck during operation of the lifting means.

17. The trailer as set forth in claim 2, wherein the elongated deck includes a plurality of cross-support members extending beneath the deck, the lifting means being operable to lift the deck relative to the undercarriage from a lowered position in which the wheels of the undercarriage are disposed partially above the cross-support members and a raised position in which the wheels are disposed completely below the cross-support member.

18. The trailer as set forth in claim 2, further comprising undercarriage guide means for guiding the undercarriage and deck support means as they are shifted along the elongated deck.

19. The trailer as set forth in claim 18, wherein the undercarriage guide means includes means for retaining the undercarriage and deck support means on the elongated deck regardless of the orientation of the elongated deck relative to the undercarriage and regardless of whether the wheels of the undercarriage are in engagement with the ground.

* * * * *